US006576731B2

(12) United States Patent
Steinhauser et al.

(10) Patent No.: US 6,576,731 B2
(45) Date of Patent: Jun. 10, 2003

(54) POLYBUTADIENES WITH A REDUCED SOLUTION VISCOSITY/MOONEY VISCOSITY RATIO

(75) Inventors: Norbert Steinhauser, Monheim (DE); Werner Obrecht, Moers (DE)

(73) Assignee: Bayer Aktiengesellschaft, Leverkusen (DE)

( * ) Notice: Subject to any disclaimer, the term of this patent is extended or adjusted under 35 U.S.C. 154(b) by 92 days.

(21) Appl. No.: 09/911,267

(22) Filed: Jul. 23, 2001

(65) Prior Publication Data

US 2002/0035226 A1 Mar. 21, 2002

(30) Foreign Application Priority Data

Jul. 27, 2000 (DE) .......................... 100 37 076

(51) Int. Cl.⁷ ...................... C08F 236/06; C08F 236/14
(52) U.S. Cl. ..................... 526/338; 526/279; 526/172
(58) Field of Search ............................... 526/279, 338, 526/172

(56) References Cited

U.S. PATENT DOCUMENTS

| 3,842,111 A | 10/1974 | Meyer-Simon et al. .. 260/448.2 E |
| 3,873,489 A | 3/1975 | Thurn et al. ......... 260/33.6 AQ |
| 3,978,103 A | 8/1976 | Meyer-Simon et al. .. 260/448.8 R |
| 3,997,356 A | 12/1976 | Thurn et al. ............ 106/288 Q |
| 4,076,550 A | 2/1978 | Thurn et al. ............ 106/288 Z |
| 4,242,232 A | 12/1980 | Sylvester et al. ....... 252/429 C |
| 4,260,707 A | 4/1981 | Sylvester et al. ........... 526/114 |
| 5,663,226 A | 9/1997 | Scholl et al. ............... 524/262 |

FOREIGN PATENT DOCUMENTS

| CA | 1143711 | 3/1983 |
| CA | 2186060 | 3/1997 |
| DE | 4435311 | 4/1996 |

*Primary Examiner*—Caixia Lu
(74) *Attorney, Agent, or Firm*—Joseph C. Gil; Noland J. Cheung; Jennifer R. Seng

(57) ABSTRACT

The invention relates to a process for the preparation of polybutadienes with a reduced solution viscosity/Mooney viscosity ratio by using polydienyl compounds, the polybutadienes which can be prepared in this process, the use of the polybutadienes according to the present invention for the preparation of rubber mixtures, the use of the rubber mixtures for the production of all types of shaped articles, and the compound dimethyldi-2,4-pentadienyl-(E,E)-silane as an intermediate product.

20 Claims, No Drawings

POLYBUTADIENES WITH A REDUCED SOLUTION VISCOSITY/MOONEY VISCOSITY RATIO

FIELD OF THE INVENTION

The invention relates to a process for the preparation of polybutadienes with a reduced solution viscosity/Mooney viscosity ratio using functional dienes, the polybutadienes which can be prepared in this process, the use of the polybutadienes according to the present invention for the preparation of rubber mixtures, the use of the rubber mixtures for the production of all types of shaped articles, and the compound dimethyldi-2,4-pentadienyl-(E,E)-silane as an intermediate product for the preparation of the polybutadienes according to the present invention.

BACKGROUND OF THE INVENTION

Polybutadiene with a high content of cis-1,4 units has been produced on a large industrial scale for a relatively long time and is employed for the production of tires and other rubber goods and for impact modification of polystyrene.

Catalysts based on compounds of the rare earths, as described in EP-A1-0 011 184 and EP-A1-0 007 027, are currently almost exclusively employed to achieve high contents of cis-1,4 units.

However, in addition to the many industrial advantages, the commercially available polybutadienes with high contents of cis-1,4 units, particularly polybutadienes prepared with catalysts based on the rare earths, have the disadvantage that they have a relatively high solution viscosity with respect to the Mooney viscosity. This is a disadvantage in the preparation and processing of the polybutadienes and for the use of these polybutadienes as impact modifiers for thermoplastics.

SUMMARY OF THE INVENTION

Thus, an object of the present invention is to provide polybutadienes with better processability. Another object was to provide polybutadienes which offer advantages when employed as impact modifiers for thermoplastics.

This object is achieved according to the present invention by a process for the polymerization of dienes, characterized in that polydienyl compounds are employed as comonomers.

DETAILED DESCRIPTION OF THE INVENTION

Polydienyl compounds in the context of the present invention are condensation products of dienes of the general formula $$R_{z-y}-X-(-CR_2-CR=CR-CR=CR)_y \quad (I)$$

wherein

R in each case independently of one another, represents a radical chosen from the group of H, $C_1$–$C_{20}$-alkyl, $C_6$–$C_{20}$-aryl and $C_7$–$C_{20}$-alkylaryl, which in its turn can be mono- or polyunsaturated or saturated, X represents an element from the group consisting of C, Si, Ge, Sn, B, Al, N, P, O and S, preferably C or Si, or X represents a polysubstituted alkyl or aryl link, such as $-(CR_2)_n-$, $-O-(CR_2)_n-O-$, $-C_6R_4-$ or $-O$-aryl-$O-$, wherein z represents the number of substituents necessary to satisfy the valencies of X R has the same meaning as above, and y represents an integer greater than 2 and is not greater than z, and preferably y=2.

Preferred polydienyl compounds are dimethyldi-2,4-pentadienylsilane, methyltri-2,4-pentadienylsilane and tetra-2,4-pentadienylsilane.

Polydienyl compounds can be prepared by techniques known to one of ordinary skill in the art.

A preferred polydienyl compound, dimethyldi-2,4-pentadienyl-(E,E)-silane, can advantageously be prepared from a technical-grade mixture comprising 1,3-pentadiene by reaction with butyllithium/potassium tert-butylate, coupling with dimethyl-dichlorosilane and subsequent distillation (cf. example 1). The invention also provides dimethyldi-2,4-pentadienyl-(E,E)-silane as an intermediate product.

It is common that various polydienyl compounds can also be employed as a mixture.

The molar ratio of the polydienyl compounds to the conventional dienes is as a rule in the range from 1:10 to 1:20,000, preferably 1:50 to 1:10,000, and most preferably, 1:100 to 1:5,000.

Conventional dienes in the context of the present invention are all the dienes which are known to one of ordinary skill in the art and have been employed with respect to polybutadiene, in particular 1,3-butadiene, 1,2-butadiene, isoprene, pentadiene and 2,3-dimethylbutadiene.

Suitable catalysts for the polymerization of the dienes and polydienyl compounds are preferably the catalyst systems which are known to one of ordinary skill in the art and are based on the rare earths, comprising A) an alcoholate of the rare earths (II), a carboxylate of the rare earths (III), a complex compound of the rare earths with diketones (IV) and/or an addition compound of the halides of the rare earths with an oxygen or nitrogen donor compound (V), of the following formulae:

(IV)

and $MX_3$ m donor (V),

B) an aluminum-trialkyl, a dialkylaluminum hydride and/or an alumoxane of the formulae (VI) to (IX):

AlR$_3$     (VI)

HAlR$_2$     (VII), wherein, in the formulae

(VIII)

(Al—O)$_{n+1}$     (IX)

and

M denotes a trivalent element of the rare earths with atomic numbers 57 to 71,

R is identical or different and denotes alkyl radicals having 1 to 10 carbon atoms, X represents chlorine, bromine or iodine, m denotes 1 to 6 and n denotes 1 to 50, C) and at least one further Lewis acid.

Preferred compounds A) are those in which M denotes lanthanum, cerium, praseodymium or neodymium or a mixture of elements of the rare earths which comprises at least one of the elements lanthanum, cerium, praseodymium or neodymium to the extent of at least 10 wt. %.

Compounds A) in which M denotes lanthanum or neodymium or a mixture of rare earths which comprises lanthanum or neodymium to the extent of at least 30 wt. % are most preferred.

Examples of suitable carboxylates of the rare earths are: lanthanum tris-(2,2-diethyl-hexanoate), praseodymium tris (2,2-diethyl-hexanoate), neodymium tris(2,2-diethyl-hexanoate), lanthanum tris(2,2-diethyl-heptanoate), praseodymium tris(2,2-diethyl-heptanoate), neodymium tris (2,2-diethyl-heptanoate), lanthanum versaticate (lanthanum salt of Versatic Acid, commercial product of Shell Chemie), praseodymium versaticate and neodymium versaticate, lanthanum naphthenate, praseodymium naphthenate and neodymium naphthenate.

Examples of suitable aluminumalkyls B) are: trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, diethylaluminum hydride, di-n-butylaluminum hydride and di-iso-butylaluminum hydride. Triethylaluminum, triisobutylaluminum and diisobutylaluminum hydride are preferred.

Lewis acids are employed as component C. Examples, which may be mentioned, are the organometallic halides in which the metal atom belongs to group 2 or 13, 14 or 15 of the periodic table according to IUPAC 1985 and halides of elements of group 15 of the period table according to IUPAC 1985, such as methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, 1-methylaluminum sesquibromide, methylaluminum sesquichloride, ethylaluminum sesquibromide, ethylaluminum sesquichloride, dibutyltin dichloride, aluminum tribromide, antimony trichloride, antimony pentachloride, phosphorus trichloride, phosphorus pentachloride and tin tetrachloride.

Diethylaluminum chloride, ethylaluminum sesquichloride, ethylaluminum dichloride, diethylaluminum bromide, ethylaluminum sesquibromide and ethylaluminum dibromide are preferred.

The reaction products of alkylaluminum compounds with halogens, e.g., triethylaluminum and bromine, as well as alkyl halides, aryl halides, arylalkyl halides and chlorosilanes, can also be employed as component C.

The molar ratio in which the catalyst components are used can be varied within wide limits.

The molar ratio of component A to component B is 1:1 to 1:100, preferably 1:3 to 1:80, and most preferably 1:3 to 1:50. The molar ratio of component A to component C is 1:0.4 to 1:15, preferably 1:0.5 to 1:8.

The polymerization is carried out in organic solvents. These solvents must be inert towards the catalyst system used. Suitable solvents are e.g. aromatic, aliphatic and cycloaliphatic hydrocarbons, such as benzene, toluene, pentane, n-hexane, iso-hexane, heptane and cyclohexane.

The polymerization can be carried out both continuously and discontinuously.

The polymerization is carried out at a temperature between −20 and 150° C., preferably between 0 and 120° C.

In a conventional embodiment, components A, B and C are added to a mixture of 100 parts by wt. of solvent with 5 to 50 parts by wt., preferably 8 to 30 parts by wt. of monomer.

When the desired conversion has been reached, the catalyst is deactivated by addition of small amounts of, for example, water, carboxylic acids or alcohols.

Conventional stabilizers can be added to the polymer solution in conventional amounts before working up. Stabilizers which are used are e.g. sterically hindered phenols or aromatic amines or phosphites, such as e.g. 2,6-di-tert-butyl-4,5-methyl-phenol.

The polymers are isolated by evaporation of the polymer solution, by precipitation with a non-solvent, such as, for example, methanol, ethanol or acetone, or, preferably, by steam distillation of the solvent.

After stripping with steam, the water is removed with suitable sieve or screw units, such as expeller or expander screws, or a fluidized bed dryer.

Drying is carried out by conventional processes, e.g. in a drying cabinet or in a screw dryer.

When the polydienyl compounds according to the present invention are employed, an undesirable increase in the Mooney viscosity may occur, but this can easily be compensated by an increased addition of B), particularly diisobutylaluminum hydride, or of A). The amount of additional B) needed depends on the required Mooney viscosity of the end product and can easily be determined by a few preliminary experiments.

It may furthermore be advantageous to preform the catalysts before use. In this case, the catalyst constituents A), B) and C) are mixed, with the addition of in the range from 1 part to 100 parts of diene per part of A), and the mixture is kept for several minutes to several days, optionally with occasional cooling to 10 to −80° C., before the system is added to the polymerization solution.

Polybutadiene, particularly that prepared with catalysts of the rare earths, with a reduced ratio of solution viscosity (SV) to Mooney viscosity (MV), the cold flow simultaneously having low values with respect to the solution viscosity, has advantages in the preparation process and in transportation, storage and processing.

In the case of conventional Nd-polybutadiene, the ratio of solution viscosity (SV) to Mooney viscosity (MV) is usually in the range from 5 to 30. In the case of the polybutadienes according to the present invention, the ratio of solution viscosity (SV) to Mooney viscosity (MV) is in the range from 0.5 to 15.

The polybutadienes according to the present invention are, furthermore, suitable for impact modification of plastics.

The invention, therefore, also provides the polybutadienes which can be prepared in the process according to the present invention.

The polybutadienes according to the present invention can be used by themselves, as a blend with aromatic or aliphatic oils or as a mixture with other rubbers. Synthetic rubbers are also suitable, in addition to natural rubbers, as additional rubbers for the production of rubber vulcanization products. Preferred synthetic rubbers are described, for example, by W. Hofmann, Kautschuktechnologie [Rubber Technology], Gentner Verlag, Stuttgart 1980 and I. Franta, Elastomers and Rubber Compounding Materials, Elsevier, Amsterdam 1989. They include, inter alia,

| | |
|---|---|
| BR | conventional polybutadiene |
| ABR | butadiene/acrylic acid $C_1$-$C_4$-alkyl ester copolymers |
| CR | polychloroprene |
| IR | polyisoprene |
| SBR | styrene/butadiene copolymers with styrene contents of 1 to 60, preferably 20 to 50 wt. % |
| IIR | isobutylene/isoprene copolymers |
| NBR | butadiene/acrylonitrile copolymers with acrylonitrile contents of 5 to 60, preferably 10 to 40 wt. % |
| HNBR | partly hydrogenated or completely hydrogenated NBR rubber |
| EPDM | ethylene/propylene/diene copolymers and mixtures of these rubbers. Rubbers which are of interest for the production of motor vehicle tires with the aid of surface-modified fillers are, in particular, natural rubber, emulsion SBR and solution SBR rubbers with a glass transition temperature above −50° C., which can optionally be modified with silyl ethers or other functional groups, as described in EP-A-0447066, polybutadiene rubber with a high 1,4-cis content (>90%), which is prepared with catalysts based on Ni, Co, Ti or Nd, and polybutadiene rubber with a vinyl content of 0 to 75%, and mixtures thereof. |

The invention also provides the rubber mixtures, which as a rule comprise 5 to 300 parts by wt. of an active or inactive filler, such as e.g.

highly dispersed silicas, prepared e.g. by precipitation of solutions of silicates or flame hydrolysis of silicon halides and having specific surface areas of 5 to 1,000, preferably 20 to 400 $m^2/g$ (BET surface area) and primary particle sizes of 10 to 400 nm. The silicas can optionally also be in the form of mixed oxides with other metal oxides, such as oxides of Al, Mg, Ca, Ba, Zn, Zr or Ti,
synthetic silicates, such as aluminum silicates or alkaline earth metal silicate, such as magnesium silicate or calcium silicate, with BET surface areas of 20 to 400 $m^2/g$ and primary particle diameters of 10 to 400 nm,
naturally occurring silicates, such as kaolin and other naturally occurring silica,
glass fibers and glass fiber products (mats, strands) or glass microbeads,
metal oxides, such as zinc oxide, calcium oxide, magnesium oxide and aluminum oxide,
metal carbonates, such as magnesium carbonate, calcium carbonate and zinc carbonate,
metal hydroxides, such as e.g. aluminum hydroxide and magnesium hydroxide,
carbon blacks. The carbon blacks to be used here are prepared by the flame black, furnace black or gas black process and have BET surface areas of 20 to 200 $m^2/g$, such as e.g. SAF, ISAF, HAF, FEF or GPF carbon blacks.
rubber gels, particularly those based on polybutadiene, butadiene/styrene copolymers, butadiene/acrylonitrile copolymers and polychloroprene.
Highly dispersed silicas and carbon blacks are most preferred.

The fillers mentioned can be employed by alone or as a mixture. In a most preferred embodiment, the rubber mixtures comprise as fillers a mixture of light-colored fillers, such as highly dispersed silicas, and carbon blacks, the mixing ratio of light-colored fillers to carbon blacks being 0.05 to 20, preferably 0.1 to 10.

The fillers are preferably added to the solution of the polybutadiene or polybutadienes according to the present invention as solids or as a suspension in water or a solvent. The rubber solution can be prepared beforehand, but the solution originating from the polymerization is preferably employed directly. The solvent is then removed by means of heat or, preferably, with the aid of steam. The conditions of this stripping process can easily be determined by preliminary experiments.

Furthermore, the fillers are preferably added to the solid polybutadiene according to the present invention or a mixture of rubbers and are mixed into this in a known manner, e.g. with a kneader.

The rubber mixtures according to the present invention, optionally, furthermore comprise crosslinking agents. Crosslinking agents which can be employed are sulfur or peroxides, sulfur being most preferred. The rubber mixtures according to the present invention can comprise further rubber auxiliary products, such as reaction accelerators, antiaging agents, heat stabilizers, light stabilizers, antiozone agents, processing auxiliaries, plasticizers, tackifiers, blowing agents, dyestuffs, pigments, waxes, extenders, organic acids, retardants, metal oxides and activators, such as triethanolamine, polyethylene glycol, hexanetriol etc. which are known to the rubber industry.

In the preferred rubber mixtures with highly active precipitated silicas, the use of additional filler activators is particularly advantageous. Preferred filler activators are sulfur-containing silyl ethers, particularly bis-(trialkoxysilyl-alkyl) polysulfides, as described in DE-A-2.141.159 and DE-A-2.225.577, oligomeric and/or polymeric sulfur-containing silyl ethers of DE-A-4.435.311 and EP-A-0 670 347, mercaptoalkyltrialkoxysilanes, preferably mercaptopropyltriethoxysilane, and thiocyanatoalkyl-silyl ethers, as described e.g. in DE-A-195 44 469.

The rubber auxiliaries are employed in conventional amounts, which depend, inter alia, on the intended use. Conventional amounts are e.g. amounts of 0.1 to 50 wt. %, based on the rubber.

Further mixing of the rubbers with the other rubber auxiliary products, crosslinking agents and accelerators mentioned can be carried out in a conventional manner with the aid of suitable mixing units, such as mills, internal mixers and mixing extruders.

Compounding and vulcanization are described in more detail, for example, in Encyclopedia of Polymer Science and Engineering, vol.4, p. 66 et seq. (compounding) and vol. 17, p. 666 et seq. (vulcanization).

The vulcanization of the rubber mixtures according to the present invention can be carried out at conventional temperatures of 100 to 200° C., preferably 130 to 180° C. (optionally under a pressure of 10 to 200 bar).

The rubber mixtures according to the present invention are outstandingly suitable for the production of all types of shaped articles.

Non-limiting examples of these shaped articles are O-rings, profiles, seals, membranes, tires, tire treads, damping elements and hoses.

Various tire components and tire treads are most preferred.

Furthermore, the rubber mixtures according to the present invention are suitable for impact modification of thermoplastics, particularly for polystyrene and styrene/acrylonitrile copolymers.

The invention is illustrated with the aid of the following embodiment examples:

EXAMPLES

Example 1

Synthesis of dimethyl-di-2,4-pentadienyl-(E,E)-silane 55.7 g (496 mmol) potassium tert-butanolate were suspended in 240 ml pentane in a dry Schlenk vessel, which had been rendered inert with argon. The suspension was cooled with acetone/dry ice, and 310 ml (496 mmol) 1.6 molar butyllithium in hexane and 59 ml (545 mmol) of a technical-grade pentadiene (90% 1.3-pentadiene as an isomer mixture of cis- and trans-1,3-pentadiene) were added. The mixture was warmed to room temperature and then stirred at room temperature for 30 min. It was then cooled again with acetone/dry ice, and 34 ml (281 mmol) dimethyldichlorosilane were added. The mixture was warmed to room temperature and stirred at room temperature for 30 min. Thereafter, it was cooled with ice-water. 200 ml of a 2.5 molar aqueous NaOH solution were added to the suspension, the two phases were mixed thoroughly by vigorous stirring, the organic phase was separated off. 200 ml water were added and the mixture was stirred, and the organic phase was separated off again and dried with $Na_2SO_4$. The solvent was separated off from the organic phase by applying a vacuum and the organic phase was then distilled in vacuo at 90° C. 16.85 g of a clear, colorless, slightly viscous liquid were obtained.

$^1$H-NMR in $CDCl_3$ (400 MHz): 0.00 (s, 6H), 1.58 (d, 4H), 4.85 (d, 2H), 5.00 (d, 2H), 5.69 (m, 2H), 5.92 (dd, 2H), 6.28 (m, 2H).

Example 2

Polymerization of Butadiene without Catalyst Preforming

A dry 1.9 l glass autoclave, which had been rendered inert with argon, was filled with 479.4 g hexane (dried over a molecular sieve) and 1.8 ml (1.8 mmol) of a 1 molar solution of diisobutylaluminum hydride in hexane, 3.0 ml (0.15 mmol) of a 0.05 molar solution of neodymium versatate in hexane, 3.0 ml (0.15 mmol) of a 0.05 molar solution of ethylaluminum sesquichloride in hexane and 100.3 g butadiene. The mixture was heated to 65° C. and polymerization was carried out for 2 h, while stirring. 340.5 g of the viscous solution were then drained off and 2 ml methanol and 0.6 g bis[3-$^t$butyl-2-hydroxy-5-methylphenyl]methane were stirred in. Thereafter, the polymer was dried in vacuo at 70° C. Weight after drying: 57.7 g Solution viscosity (5.43% in toluene, at room temperature): 770 mPas. Mooney viscosity (ML 1+4 at 100° C.): 46 MU. Cold flow (50° C.): 9.1 mg/min.

Example 3

Copolymerization of Butadiene and Dimethyl-di-2, 4-pentadienyl-(E,E)-silane without Catalyst Preforming A dry 1.9 l glass autoclave, which had been rendered inert with argon, was filled with 499.2 g hexane (dried over a molecular sieve) and 3.6 ml (3.6 mmol) of a 1 molar solution of diisobutylaluminum hydride in hexane, 3.0 ml (0.15 mmol) of a 0.05 molar solution of neodymium versatate in hexane, 3.0 ml (0.15 mmol) of a 0.05 molar solution of ethylaluminum sesquichloride in hexane, 1.8 ml (1.8 mmol) of a 1 molar solution of dimethyl-di-2,4-pentadienyl-(E,E)-silane in hexane and 100.0 g of butadiene. The mixture was heated to 65° C. and polymerization was carried out for 2 h, while stirring. 517.9 g of the viscous solution were then drained off and 2 ml methanol and 0.6 g bis[3-$^t$butyl-2-hydroxy-5-methylphenyl]methane were stirred in. Thereafter, the polymer was dried in vacuo at 70° C.

Weight after drying: 79.2 g. Solution viscosity (5.43% in toluene, at room temperature): 330 mPas. Mooney viscosity (ML 1+4 at 100° C.): 41 MU. Cold flow (50° C.): 4.9 mg/min.

Example 4

Polymerization of Butadiene with Catalyst Preforming

Catalyst Preforming:

6.4 ml (36 mmol) diisobutylaluminum hydride, 1.2 ml (12 mmol) isoprene and 11.3 ml (3 mmol) of a 0.265 molar solution of neodymium versatate in hexane were introduced into a dry Schlenk vessel which had been rendered inert with argon. The mixture was stirred at 50° C. for 90 min. It was then cooled to 5° C. and 8 ml (2 mmol) of a 0.25 molar solution of ethylaluminum sesquichloride in hexane were added. The preformed catalyst solution was left to stand overnight at room temperature and then employed for the polymerization.

Polymerization

A dry 1.9 l glass autoclave which had been rendered inert with argon was filled with 582.6 g hexane (dried over a molecular sieve) and 0.54 ml (0.54 mmol) of a 1 molar solution of triisobutylaluminum in hexane, 1.63 ml (0.18 mmol Nd) of the preformed catalyst solution described above and 120.2 g butadiene. The mixture was heated to 65° C. and polymerization was carried out for 2 h, while stirring. 613.2 g of the viscous solution were then drained off and 2 ml methanol and 0.6 g bis[3-$^t$butyl-2-hydroxy-5-methylphenyl]methane were stirred in. Thereafter, the polymer was dried in vacuo at 70° C.

Weight after drying: 101.8 g. Solution viscosity (5.43% in toluene, at room temperature): 290 mPas. Mooney viscosity (ML 1+4 at 100° C.): 45 MU. Cold flow (50° C.): 22.2 g/min.

Example 5

Copolymerization of Butadiene and Dimethyl-di-2, 4-pentadienyl-(E,E)-silane with Catalyst Preforming Catalyst Preforming 7.5 ml (42 mmol) diisobutylaluminum hydride, 1.2 ml (12 mmol) isoprene and 11.3 ml (3 mmol) of a 0.265 molar solution of neodymium versatate in hexane were introduced into a dry Schlenk vessel which had been rendered inert with argon. The mixture was stirred at 50° C. for 90 min. It was then cooled to 5° C. and 8 ml (2 mmol) of a 0.25 molar solution of ethylaluminum sesquichloride in hexane were added. The preformed catalyst solution was left to stand overnight at room temperature and then employed for the polymerization.

Polymerization

A dry 1.9 l glass autoclave which had been rendered inert with argon was filled with 502.7 g hexane (dried over a molecular sieve) and 3.1 ml (3.1 mmol) of a 1 molar solution of diisobutylaluminum hydride in hexane, 0.9 ml (4.2 mmol) dimethyl-di-2,4-pentadienyl-(E,E)-silane, 1.5 ml (0.16 mmol Nd) of the preformed catalyst solution described above and 106.2 g butadiene. The mixture was heated to 65° C. and polymerization was carried out for 3 h, while stirring. 541.3 g of the viscous solution were then drained off and 2 ml methanol and 0.6 g bis[3-$^t$butyl-2-hydroxy-5-methylphenyl]methane were stirred in. Thereafter, the polymer was dried in vacuo at 70° C.

Weight after drying: 92.1 g. Solution viscosity (5.43% in toluene, at room temperature): 85 mPas. Mooney viscosity (ML 1+4 at 100° C.): 39 MU. Cold flow (50° C.): 6.7 g/min.

Example 6

Copolymerization of Butadiene and dimethyl-di-2,4-pentadienyl-(E,E)-silane with Catalyst Preforming Catalyst Preforming:
Described in example 5.

Polymerization

A dry 1.9 l glass autoclave which had been rendered inert with argon was filled with 509.7 g hexane (dried over a molecular sieve) and 2.2 ml (2.2 mmol) of a 1 molar solution of diisobutylaluminum hydride in hexane, 0.9 ml (4.2 mmol) dimethyl-di-2,4-pentadienyl-(E,E)-silane, 1.5 ml (0.16 mmol Nd) of the preformed catalyst solution described above and 106.6 g butadiene. The mixture was heated to 65° C. and polymerization was carried out for 4 h, while stirring. 510.5 g of the viscous solution were then drained off and 2 ml methanol and 0.6 g bis[3-$^t$butyl-2-hydroxy-5-methylphenyl]methane were stirred in. Thereafter, the polymer was dried in vacuo at 70° C.

Weight after drying: 89.8 g. Solution viscosity (5.43% in toluene, at room temperature): 190 mPas. Mooney viscosity (ML 1+4 at 100° C.): 80 MU. Cold flow (50° C.): 1.2 g/min.

| | | | Polymer properties | | |
|---|---|---|---|---|---|
| Example | Catalyst | Monomers | Solution viscosity[a] | Mooney viscosity[b] | Cold flow[c] |
| 2 | without preforming | 1,3-butadiene | 770 mPas | 46 MU | 9.1 mg/min |
| 3 | without preforming | 1,3-butadiene, dimethyl-di-2,4-pentadienyl-(E,E)-silane | 330 mPas | 41 MU | 4.9 mg/min |
| 4 | with preforming | 1,3-butadiene | 290 mPas | 45 MU | 22.2 mg/min |
| 5 | with preforming | 1,3-butadiene, dimethyl-di-2,4-pentadienyl-(E,E)-silane | 85 mPas | 39 MU | 6.7 mg/min |
| 6 | with preforming | 1,3-butadiene, dimethyl-di-2,4-pentadienyl-(E,E)-silane | 190 mPas | 80 MU | 1.2 mg/min |

[a] 5.43% solution in toluene at room temperature
[b] ML 1 + 4 at 100° C. (DIN 53523)
[c] at 50° C. (DIN 53547).

It can be seen from the examples that when dimethyl-di-2,4-pentadienyl-(E,E)-silane is used, both the solution viscosity and the cold flow are lowered (comp. ex. 2 with ex. 3 and ex. 4 with ex. 5 and 6). On the other hand, if only catalyst preforming is carried out, without using dimethyl-di-2,4-pentadienyl-(E,E)-silane, the solution viscosity is indeed lowered, but at the same time the cold flow is increased (comp. ex. 2 with ex. 4). However, high cold flow values are unfavorable for storage and transportation of rubbers.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of polybutadiene, comprising the step of polymerizing butadiene with one or more polydienyl compounds.

2. A process according to claim 1, wherein said polymerizing of the butadiene and one or more polydienyl compounds occurs in the presence of a catalyst based on the rare earth transition metal compound.

3. A process according to claim 2, wherein said catalyst is a preformed catalyst.

4. A process according to claim 1, wherein said one or more polydienyl compounds are selected from the group consisting of dimethyldi-2,4-pentadienylsilane, methyltri-2,4-pentadienylsilane and tetra-2,4-pentadienylsilane.

5. A process according to claim 4, wherein said one or more polydienyl compound is dimethyldi-2,4-pentadienyl-(E,E)-silane.

6. A polybutadiene prepared from a process comprising the step of polymerizing butadiene with one or more polydienyl compounds.

7. A polybutadiene according to claim 6, wherein said polymerizing of the butadiene and one or more polydienyl compounds occurs in the presence of a catalyst based on the rare earth transition metal compound.

8. A polybutadiene according to claim 7, wherein said catalyst is a preformed catalyst.

9. A polybutadiene according to claim 6, wherein said one or more polydienyl compounds are selected from the group consisting of dimethyldi-2,4-pentadienylsilane, methyltri-2,4-pentadienylsilane and tetra-2,4-pentadienylsilane.

10. A polybutadiene according to claim 6, wherein said one or more polydienyl compound is dimethyldi-2,4-pentadienyl-(E,E)-silane.

11. A composition comprising dimethyldi-2,4-pentadienyl-(E,E)-silane.

12. Rubber mixtures comprising a polybutadiene prepared from a process comprising the step of polymerizing butadiene with one or more polydienyl compounds.

13. Rubber mixtures according to claim 12, wherein said polymerizing of the butadiene and one or more polydienyl compounds occurs in the presence of a catalyst based on the rare earth transition metal compound.

14. Rubber mixtures according to claim 13, wherein said catalyst is a preformed catalyst.

15. Rubber mixtures according to claim 12, wherein said one or more polydienyl compounds are selected from the group consisting of dimethyldi-2,4-pentadienylsilane, methyltri-2,4-pentadienylsilane and tetra-2,4-pentadienylsilane.

16. Rubber mixtures according to claim 12, wherein said one or more polydienyl compound is dimethyldi-2,4-pentadienyl-(E,E)-silane.

17. A shaped article comprising a polybutadiene prepared from a process comprising the step of polymerizing butadiene with one or more polydienyl compounds.

18. A shaped article according to claim 17, wherein said shaped article is a tire component.

19. A process for the impact modification of thermoplastics comprising a polybutadiene prepared from a process comprising the step of polymerizing butadiene with one or more polydienyl compounds.

20. A process according to claim 19, wherein said thermoplastics comprises polystyrene and styrene/acrylonitrile copolymers.

* * * * *